United States Patent
Lin et al.

(10) Patent No.: US 11,455,448 B2
(45) Date of Patent: *Sep. 27, 2022

(54) METHOD FOR ANALYZING ELECTROMIGRATION (EM) IN INTEGRATED CIRCUIT

(71) Applicant: Taiwan Semiconductor Manufacturing Company, Ltd., Hsinchu (TW)

(72) Inventors: Chin-Shen Lin, Taipei (TW); Ming-Hsien Lin, Hsinchu County (TW); Wan-Yu Lo, Taoyuan (TW); Meng-Xiang Lee, Dounan Township (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,393

(22) Filed: Mar. 23, 2021

(65) Prior Publication Data
US 2021/0209278 A1 Jul. 8, 2021

Related U.S. Application Data

(63) Continuation of application No. 16/734,487, filed on Jan. 6, 2020, now Pat. No. 10,963,609.
(Continued)

(51) Int. Cl.
*G06F 30/00* (2020.01)
*G06F 30/3308* (2020.01)
(Continued)

(52) U.S. Cl.
CPC ........ *G06F 30/3308* (2020.01); *G06F 30/392* (2020.01); *G06F 2119/02* (2020.01); *G06F 2119/10* (2020.01)

(58) Field of Classification Search
CPC .............. G06F 30/3308; G06F 30/392; G06F 2119/02; G06F 2119/10; G06F 2119/14; G06F 30/398
See application file for complete search history.

(56) References Cited

U.S. PATENT DOCUMENTS

| 5,581,475 A | 12/1996 | Majors |
| 7,739,632 B2 | 6/2010 | Bergman et al. |

(Continued)

FOREIGN PATENT DOCUMENTS

JP 2015149336 A * 8/2015

OTHER PUBLICATIONS

Todri et al.; "Electromigration Study of Power-Gated Grids"; ISLPED'09; Aug. 19-21, 2009; San Francisco, California, USA; pp. 315-318.

*Primary Examiner* — Naum Levin
(74) *Attorney, Agent, or Firm* — McClure, Qualey & Rodack, LLP

(57) ABSTRACT

Methods for analyzing electromigration (EM) in an integrated circuit (IC) are provided. The layout of the IC is obtained. A metal segment is selected from the layout according to a current simulation result of the IC. EM rule is kept on the metal segment when a single via is formed over and in contact with the metal segment in the layout. The EM rule is relaxed on the metal segment when two first vias are formed over and in contact with the metal segment in the layout. The two first vias have the same current direction.

20 Claims, 9 Drawing Sheets

Related U.S. Application Data

(60) Provisional application No. 62/884,209, filed on Aug. 8, 2019.

(51) Int. Cl.
*G06F 30/392* (2020.01)
*G06F 119/10* (2020.01)
*G06F 119/02* (2020.01)

(56) References Cited

U.S. PATENT DOCUMENTS

| | | | |
|---|---|---|---|
| 7,810,051 B2 * | 10/2010 | Ohashi | G06F 30/39 |
| | | | 716/118 |
| 7,823,102 B2 | 10/2010 | Chandra et al. | |
| 7,823,105 B2 * | 10/2010 | Ohshima | G06F 30/39 |
| | | | 716/106 |
| 8,056,039 B2 * | 11/2011 | Chanda | H01L 23/528 |
| | | | 716/54 |
| 8,631,372 B2 | 1/2014 | Yu et al. | |
| 8,648,592 B2 | 2/2014 | Lin et al. | |
| 8,793,632 B2 | 7/2014 | Demircan et al. | |
| 8,826,216 B2 | 9/2014 | Bose et al. | |
| 8,994,183 B2 | 3/2015 | Iwasaki et al. | |
| 9,152,751 B2 | 10/2015 | Lin et al. | |
| 9,165,882 B2 | 10/2015 | Lin et al. | |
| 9,208,277 B1 | 12/2015 | Lamant | |
| 9,311,440 B2 * | 4/2016 | Kao | G06F 30/392 |
| 9,405,883 B2 | 8/2016 | Lin et al. | |
| 9,455,220 B2 | 9/2016 | Shroff et al. | |
| 9,665,680 B2 | 5/2017 | Sapatnekar et al. | |
| 9,710,577 B2 | 7/2017 | Baumgartner et al. | |
| 10,157,258 B2 * | 12/2018 | Lin | G06F 30/394 |
| 10,574,198 B2 | 2/2020 | Shilimkar et al. | |
| 10,651,201 B2 | 5/2020 | Kim et al. | |
| 10,963,609 B2 * | 3/2021 | Lin | G06F 30/392 |
| 2006/0080630 A1 | 4/2006 | Lin | |
| 2008/0086708 A1 | 4/2008 | Rittman | |
| 2017/0220725 A1 | 8/2017 | Lin et al. | |
| 2018/0082010 A1 | 3/2018 | Lo et al. | |
| 2021/0209278 A1 * | 7/2021 | Lin | G06F 30/392 |

* cited by examiner

METHOD FOR ANALYZING ELECTROMIGRATION (EM) IN INTEGRATED CIRCUIT

CROSS REFERENCE TO RELATED APPLICATIONS

This Application is a Continuation of application Ser. No. 16/734,487, filed on Jan. 6, 2020, now U.S. Pat. No. 10,963,609, which claims priority of U.S. Provisional Application No. 62/884,209, filed on Aug. 8, 2019, the entirety of which are incorporated by reference herein.

BACKGROUND

Electromigration (EM) is a term used to describe the transport of material caused by the gradual movement of ions in a conductor due to the momentum transfer between conducting electrons and diffusing metal atoms. This effect is important in applications where high direct current densities are used, such as in microelectronics and related structures. As the structure size in electronics such as integrated circuits (ICs) decreases, the practical significance of this effect increases. If the effects of EM are not taken into account when designing the layout of an IC, the lifetime of the circuit may be drastically shortened.

Many different tools have been developed to aid in the design of integrated circuits. One of those tools is capable of reviewing a circuit layout and simulating the amount of current drawn throughout the circuit in order to determine of if the circuit is compliant with a series of EM rules applicable for a given manufacturing process. When IC layouts are large and complex, it becomes time consuming to perform the EM simulation each time a change is made to the elements of the layout.

BRIEF DESCRIPTION OF THE DRAWINGS

Aspects of the present disclosure are best understood from the following detailed description when read with the accompanying figures. It should be noted that, in accordance with the standard practice in the industry, various nodes are not drawn to scale. In fact, the dimensions of the various nodes may be arbitrarily increased or reduced for clarity of discussion.

DETAILED DESCRIPTION

Figure 1:
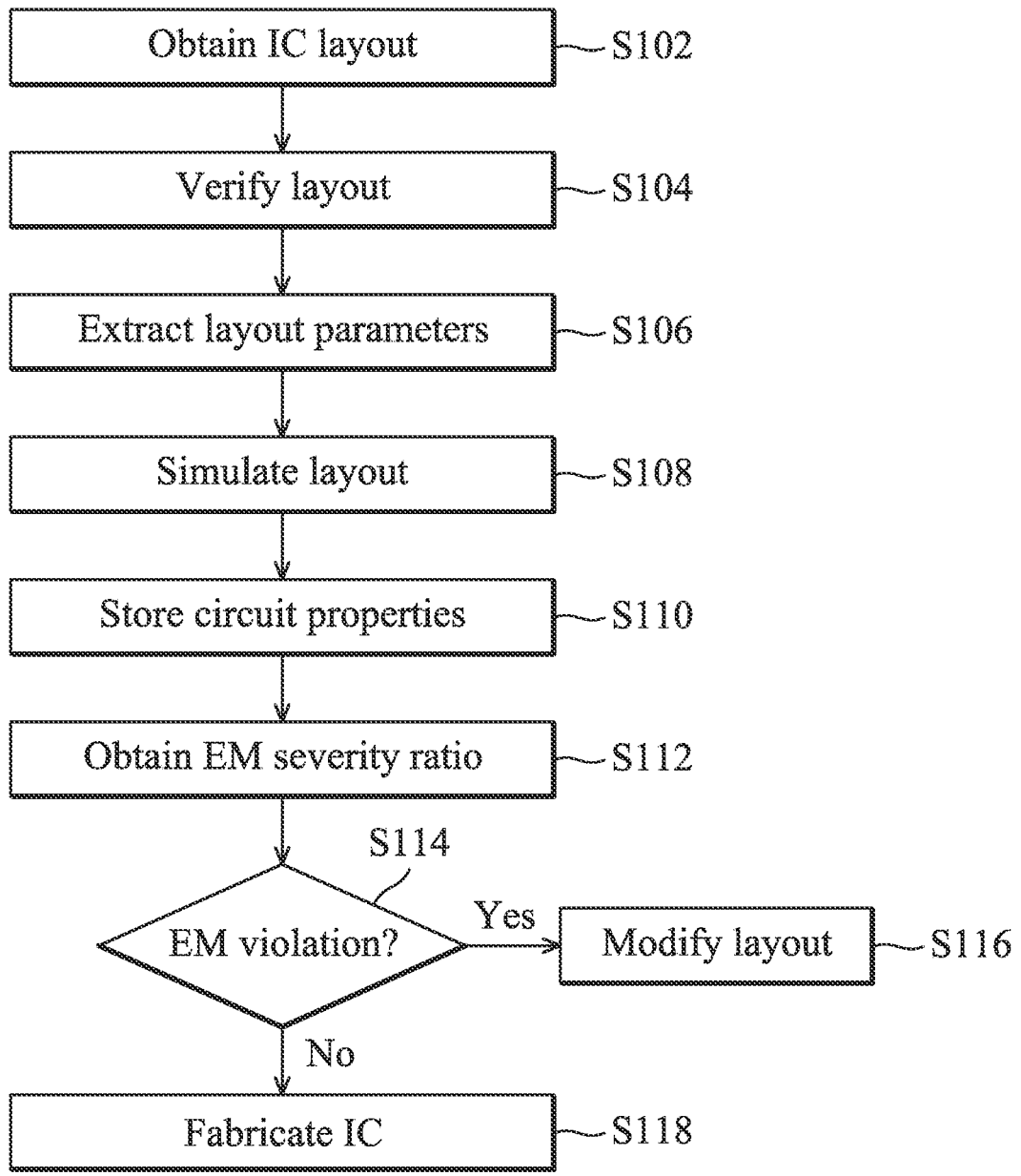
FIG. 1 illustrates a method for analyzing EM in an integrated circuit (IC), in accordance with some embodiments of the disclosure.

The following disclosure provides many different embodiments, or examples, for implementing different nodes of the subject matter provided. Specific examples of components and arrangements are described below to simplify the present disclosure. These are, of course, merely examples and are not intended to be limiting. In some embodiments, the formation of a first node over or on a second node in the description that follows may include embodiments in which the first and the second nodes are formed in direct contact, and may also include embodiments in which additional nodes may be formed between the first and the second nodes, such that the first and the second nodes may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In integrated circuit (IC) design, a variety of functions are integrated into one chip, and an application specific integrated circuit (ASIC) or system on a chip (SOC) cell based design is often used. In this approach, a library of known functions is provided, and after the functional design of the device is specified by choosing and connecting these standard functions, and proper operation of the resulting circuit is verified using electronic design automation (EDA) tools, the library elements are mapped on to predefined layout cells, which contain prefigured elements such as transistors. The cells are chosen with the particular semiconductor process nodes and parameters in mind and create a process-parameterized physical representation of the design. The design flow continues from that point by performing placement and routing of the local and global connections needed to form a layout of the completed design using the standard cells.

After the layout is completed, various analysis procedure are performed and the layout is verified to check whether the layout violates any of the various constraints or rules. For example, design rule check (DRC), layout versus schematic (LVS) and electric rule check (ERC) are performed. The DRC is a process of checking whether the layout is successfully completed with a physical measure space according to the design rule, and the LVS is a process of checking whether the layout meets a corresponding circuit diagram. In addition, the ERC is a process of for checking whether devices and wires/nets are electrically well connected therebetween. After design rule checks, design rule verification, timing analysis, critical path analysis, static and dynamic power analysis, and final modifications to the design, a tape out process is performed to produce photomask generation data. This photomask generation (PG) data is then used to create the optical masks used to fabricate the semiconductor device in a photolithographic process at a wafer fabrication facility (FAB). In the tape out process, the database file of the IC is converted into a Graphic Database System (GDS) file (e.g., a GDS file or a GDSII file). The GDS file is then used to make various layers of masks for integrated circuit manufacturing. Specifically, the GDS file became the industry's standard format for transfer of IC layout data between design tools of different vendors.

As the size of metal interconnect layers has decreased due to scaling, electromigration (EM) has become an increasing reliability concern for ICs. This is because the smaller size of the metal interconnect layers increases a current density of signals conveyed by the metal interconnect layers. Since EM is proportional to current density, the increased current density also increases EM.

FIG. 1 illustrates a method for analyzing EM in an integrated circuit (IC), in accordance with some embodiments of the disclosure. The method of FIG. 1 may include other operations not illustrated here, and the various illustrated operations of method may be performed in a different order than shown. The method of FIG. 1 may be performed by one or more processing devices within a computing device capable of performing EDA tools. The computing device may be specially designed for high-speed calculations in order to perform EM simulations on large and complex circuit layouts.

In operation S102, the layout of the IC is obtained, and the layout of the IC will be simulated and checked for compliance with EM rules. The layout includes a representation of the components, and interconnects (e.g., metal lines and vias) that make up various circuits within the IC. The components may include MOSFETs, BJTs, diodes, resistors, capacitors, and inductors. Furthermore, the layout includes the geometrical configuration of the components to be fabricated onto a substrate of the IC. The data of the layout is commonly provided as a GDS file. The most common industry standard circuit layout file formats include GDSII, GDSIII, and GDSIV. For example, the layout of each circuit in the IC may include a plurality of transistors, a plurality of metal lines at various heights above the substrate surface, and a plurality of vias that provide electrical connection between different height levels above the substrate surface.

In operation S104, a layout verification (e.g., LVS) is performed on the layout to ensure that all connections have been properly made to each component of the circuits of the IC. Any software capable of comparing the layout schematic of each circuit to a netlist of the circuit (looking for a match) may be used to perform the verification. Such software programs would be known to one skilled in the art.

In operation S106, layout parameters are extracted from the layout. The layout parameters may include geometry information regarding interconnects, such as the length, width, and thickness of each metal line and the size of each via. The layout parameters may also include material properties of the metal lines and vias based on what materials are chosen (e.g., aluminum, copper, or gold for the metal lines; tungsten for the vias, etc.). Each metal line may also include a stack of different metals or metal alloys. The via may also include a metal alloy.

In some embodiments, the layout parameters are used to determine parasitic electrical properties of the interconnects, such as the metal lines and vias. The parasitic electrical properties may include resistance, capacitance, and inductance of the metal lines and vias. Furthermore, the parasitic electrical properties may be used instead of the geometrical layout parameters when simulating the circuit layout.

In operation S108, a simulation is performed on the layout based on the values of the circuit components and the extracted layout parameters (or parasitic electrical properties), so as to determine circuit properties. The circuit properties may include current draw, voltages at each node of the circuits, and capacitances throughout the circuits of the IC. The simulated circuit properties are used in the determination of whether the circuit layout is compliant with EM rules. In some embodiments, simulation tools such as Simulation Program with Integrated Circuits Emphasis (SPICE) can be used to simulate the layout based on the values of the circuit components and the extracted layout parameters.

In operation S110, the simulated circuit properties of the layout are stored for subsequent procedures. The circuit properties may be stored in any known storage device or memory, such as RAM, ROM, FLASH, etc. The circuit properties may only need to be stored during the first time that the circuit layout is simulated.

In operation S112, the simulated circuit properties are compared with various EM rules to obtain the EM severity ratios corresponding to the simulated circuit properties. For each simulated circuit property, the EM severity ratio is the ratio between the simulated circuit property (e.g., a simulated current) of the layout in design and EM limit (e.g., the maximum drawing current) of the EM rule from the foundry design rule. The EM rule may be predetermined and used to define the current draw in the corresponding portion of the layout. For example, if the simulated current drawn through a particular metal line exceeds or equal to the EM limit, the EM severity ratio is equal to or greater than 100%. Conversely, if the simulated current drawn through the particular metal line does not exceed the EM limit, the EM severity ratio is less than 100%. Furthermore, the EM rules based on the various geometric and material properties of each of the metal lines and vias can be used to compare the simulated circuit properties.

In operation S114, EM violation check is performed according to the EM severity ratios, so as to determine whether EM violation is present. For example, if the EM severity ratio of a particular metal line indicates that the current drawn through the particular metal line exceeds a threshold value (e.g., the EM limit), an EM violation is present on the particular metal line. In other words, the EM rule check on the particular metal line is fail, and thus the layout of the IC is not compliant. Therefore, the layout corresponding to the particular metal line should be modified to compliant with EM rules (operation S116).

For example, an exemplary EM rule may have a threshold current for a metal line that has a length or a width greater than a specific dimension. Thus, if the metal line draws a current greater than the threshold current, it is determined that the EM severity ratio is greater than 100%, and a EM violation is present on the metal line. Therefore, the layout corresponding to the metal line would be non-compliant with the exemplary EM rule.

In operation S116, one or more portions of the layout are changed. The change may be made manually by a user using a user interface to interact with the layout, or the change may be made automatically by the computer system performing the simulation.

In some embodiments, the changed portions include changing a width, a length, a thickness, and/or a material property of any of the metal lines in the layout. In some embodiments, the changed portions include changes to the size (i.e., geometric dimensions) and number of vias in the layout. In some embodiments, the changed portions include changes to features of the circuit components, such as changing the doping profile, gate length, or gate width of any of the transistors in the layout. The changes to the layout may be made in response to the layout being found to be non-compliant with the EM rules. After the changes have been made, the layout will herein be referred to as the updated layout.

If no EM violation is present in operation S114, i.e., each simulated current is found to be compliant with the EM rules, the IC is fabricated according to the layout (operation S118).

The method of FIG. 1 may be performed for any layout that is to be simulated to check for compliance with EM rules. If any of the simulated current values drawn in the layout is found to be too high, the layout is modified to obtain the updated layout. In some embodiments, the method of FIG. 1 may be performed again for the updated layout. In some embodiments, only the modified portions of the updated layout are checked for compliance with EM rules.

Prior to fabrication of the semiconductor device from the layout of IC, an EM analysis is performed on the layout in order to detect whether the interconnects (e.g., metal lines and via) are in compliance with or in violation of an EM rule. When each of the interconnects is detected to be EM rule compliant will the fabrication of the semiconductor device start.

In the method of FIG. 1, an EM rule relax procedure is performed in operation S112 or S114 to decrease the EM severity ratios for EM redundancy effect. The EM rule relax procedure is used to avoid EM violations that are negligible, thereby decreasing loss of design overhead and layout size.

Figure 2:
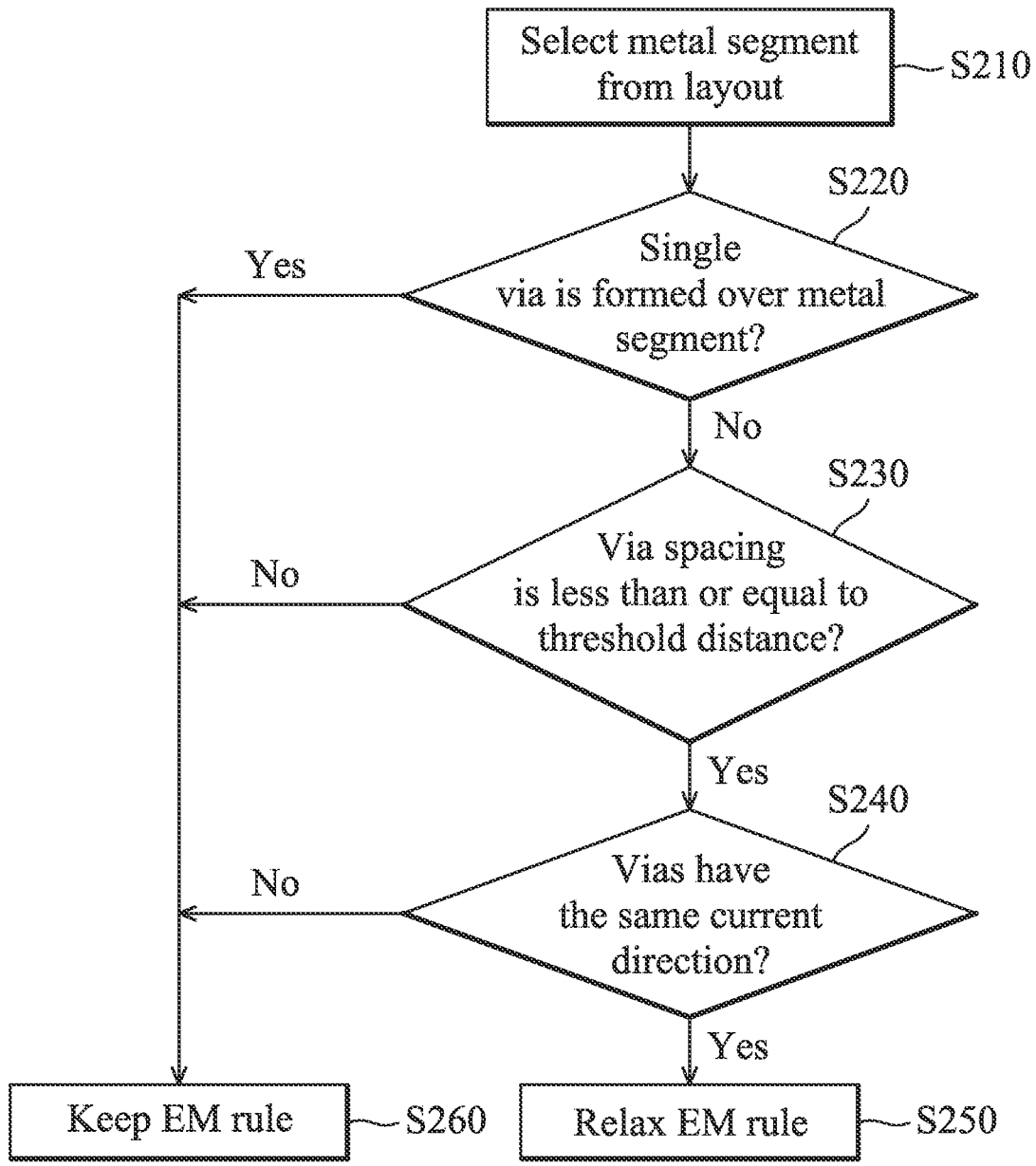
FIG. 2 illustrates a flowchart of the EM rule relax procedure, in accordance with some embodiments of the disclosure.
Figure 3:
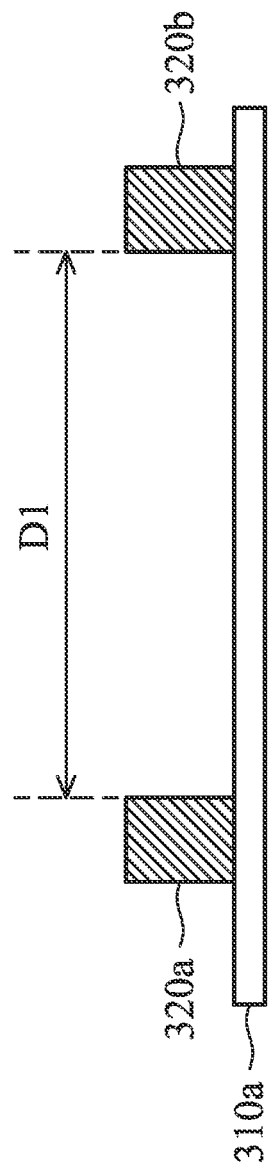
FIG. 3 shows a metal segment to be checked by the EM rule relax procedure of FIG. 2 for EM rule relax, in accordance with some embodiments of the disclosure.

FIG. 2 illustrates a flowchart of the EM rule relax procedure, in accordance with some embodiments of the disclosure. The flowchart of FIG. 2 may include other operations not illustrated here, and the various illustrated operations of method may be performed in a different order than shown. The flowchart of FIG. 2 may be performed in operation S112 or S114 of the method in FIG. 1. FIG. 3 shows a metal segment 310a to be checked by the EM rule relax procedure of FIG. 2 for EM rule relax, in accordance with some embodiments of the disclosure.

In operation S210, the metal segment 310a of FIG. 3 is selected from the layout according to the current simulation result of the IC (e.g., the simulated circuit properties). As described above, the simulated circuit properties is obtained in operation S108 of the method in FIG. 1. Furthermore, the simulated circuit properties can be compared with various EM rules to obtain the EM severity ratios. In some embodiments, a metal segment having an EM severity ratio that is greater than a specific value (e.g., 80%) is selected from the layout.

In operation S220, it is determined whether a single via is formed over the metal segment 310a. If only the single via is formed over and in contact with the metal segment 310a, the EM rule is kept for the metal segment 310a without relaxing (operation S260). Conversely, if two (or more) vias 320a and 320b are formed over and in contact with the metal segment 310a, it is determined whether the distance between the two vias is less than or equal to a threshold distance (operation S230). In the example of FIG. 3, the two vias 320a and 320b are formed over the metal segment 310a and in contact with the metal segment 310a, and the distance between the vias 320a and 320b is the via spacing D1. Furthermore, the vias 320a and 320b are positioned at two sides of the metal segment 310a. In some embodiments, the distance between the vias 320a and 320b is less than or equal to 3 um (micrometer). In some embodiments, the distance between the vias 320a and 320b is within a specific range, such as from 1 um to 3 um. It should be noted that the threshold distance or the specific range is determined based on the parameters of the processes that are used to fabricate the IC.

In operation S230, if the distance between the vias 320a and 320b is greater than the threshold distance, the EM rule is kept for the metal segment 310a without relaxing (operation S260). Conversely, if the distance between the vias 320a and 320b is less than or equal to the threshold distance, it is determined whether the vias 320a and 320b have the same current direction (e.g., downward or upward) according to the current simulation result of the IC (operation S240). In some embodiments, the order of operations S230 and S240 can be interchanged.

The current direction of each via represents a direction in which the current flows through the via. In some embodiments, the current direction of the vias 320a and 320b is downward when the metal segment 310a is a power net for transferring a power signal VDD. In some embodiments, the current direction of the vias 320a and 320b is upward when the metal segment 310a is a ground net for transferring a ground signal VSS. In some embodiments, the current direction of the vias 320a and 320b may be upward or downward when the metal segment 310a is a signal net for transferring a signal. Detail of the current direction will be described below.

In operation S240, if the vias 320a and 320b have different current directions, such as one is the upward direction and another is the downward direction, the EM rule is kept for the metal segment 310a without relaxing (operation S260). Conversely, if the vias 320a and 320b have the same current direction, the EM rule is relaxed. In some embodiments, the EM rule is relaxed by decreasing the EM severity ratio of the metal segment 310a. As described above, the EM severity ratio is the ratio between the simulated circuit property (e.g., a simulated current) of the layout in design and EM limit (e.g., the maximum drawing current) of the EM rule from the foundry design rule. For example, assuming the EM severity ratio of the metal segment 310a is 90% originally, the EM severity ratio of the metal segment 310a may be decreased to 60% in operation S250. Thus, no additional manpower is required to confirm the metal segment 310a having higher EM severity ratio, thereby save cost of the IC.

Figure 4:
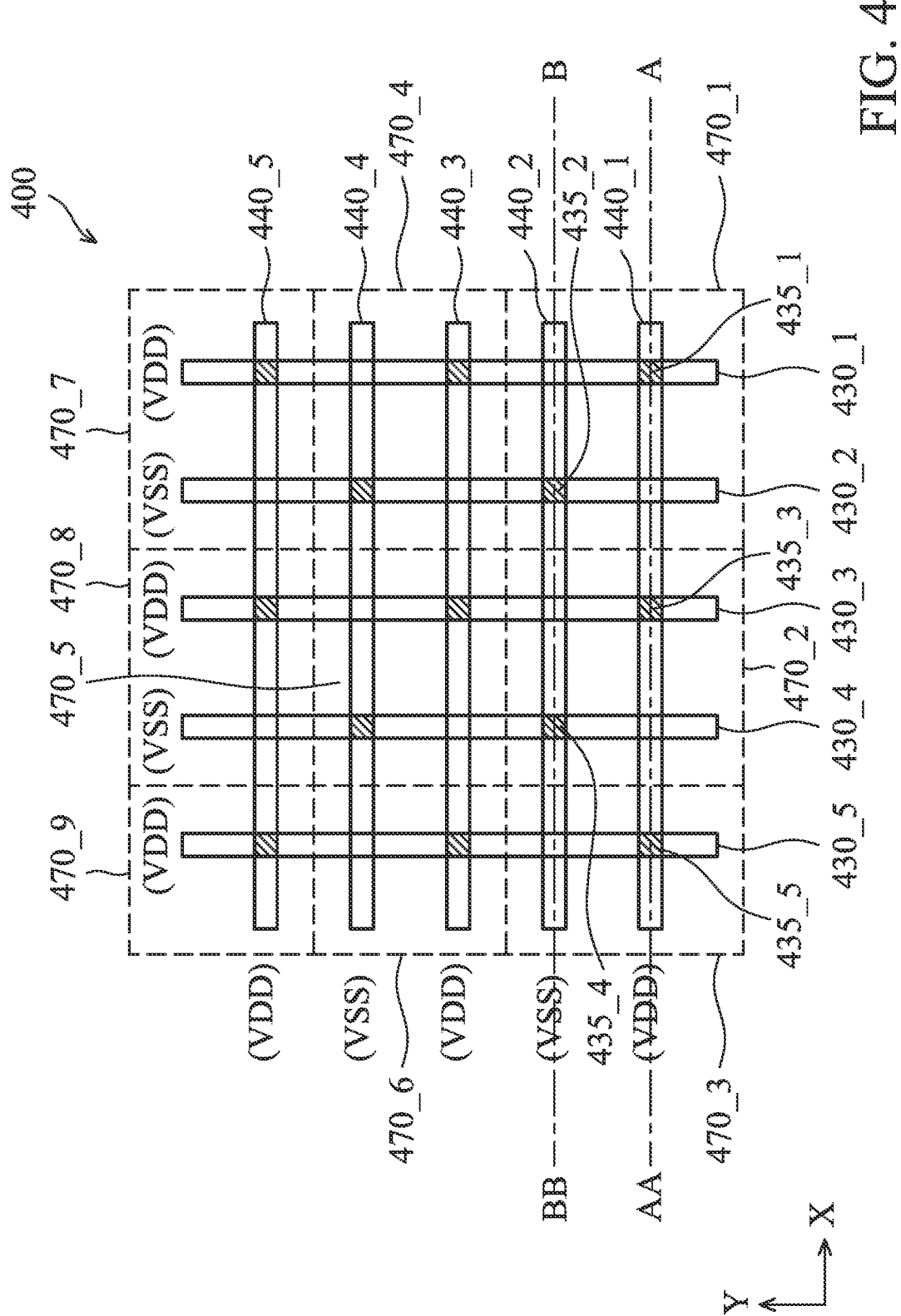
FIG. 4 shows a top view illustrating a circuit of the IC, in accordance with some embodiments of the disclosure.

FIG. 4 shows a top view illustrating a circuit 400 of the IC, in accordance with some embodiments of the disclosure. The circuit 400 includes multiple standard cells 470_1 through 470_9 arranged in a cell array. Furthermore, the outer boundary of each of the standard cells 470_1 through 470_9 is illustrated using dashed lines. It should be noted that the configuration of the standard cells 470_1 through 470_9 in the cell array is used as an illustration, and not to limit the disclosure.

In various embodiments, the row or the column in the cell array may include more standard cells or fewer standard cells than the layout shown in FIG. 4. In various embodiments, the cell array may include more rows or fewer rows and more columns or fewer columns than the layout shown in FIG. 4.

A power grid of the circuit 400 is used to deliver power and ground to the transistors of standard cells 470_1 through 470_9 as efficiently as possible. The power grid is a power distribution network. In general, a power distribution network should have minimal voltage variation and a high current-carrying capability. For example, if the voltage variation caused by the power grid is increased, the signal strength of the delivered power is decreased, and IR drop is present. Thus, the components (e.g. standard cells or transistors) of the IC cannot work normally, experiencing such problems as function failure, or a reduction of operating speed.

The power grid of the circuit 400 is formed by a large amount of metal lines 440_1 through 440_5 and 430_1 through 430_5. For example, the metal lines 440_1 through 440_5 are formed in a upper metal layer (e.g., a top metal layer), and the metal lines 440_1 through 440_5 are arranged parallel to a X-direction. The metal lines 430_1 through 430_5 are formed in a lower metal layer that is under the upper metal layer, and the metal lines 430_1 through 430_5 are arranged parallel to a Y-direction. Therefore, the metal lines 430_1 through 430_5 is perpendicular to the metal lines 440_1 through 440_5.

EM has long been a problem in power grids used in the semiconductor industry. As electrons pass through a conductor (e.g. a metal wire/line), they tend to drag the metallic ions of the conductor along with them through electrostatic attraction. This results in a slight concentration gradient in the direction of electron flow which in turn sets up an opposing diffusion gradient, so-called back pressure, that tends to move ions towards regions of lower density. If current flows long enough at a sufficiently high current density, the 'electron wind' effect dominates and vacancies form which eventually lead to voids and, finally, open circuits, thereby decreasing the reliability of ICs.

In the power grid of the circuit 400, the metal lines 440_1, 440_3 and 440_5 of the upper metal layer and the metal lines 430_1, 430_3 and 430_5 of the lower metal layer are power nets for transferring a power signal VDD, and the metal lines 440_1, 440_3 and 440_5 are coupled to the metal lines 430_1, 430_3 and 430_5 through the vias between the upper metal layer and the lower metal layer. Furthermore, the metal lines 440_2 and 440_4 of the upper metal layer and the metal lines 430_2 and 430_4 of the lower metal layer are ground nets for transferring a ground signal VSS (grounding), and the metal lines 440_2 and 440_4 are coupled to the metal lines 430_2 and 430_4 through the vias between the upper metal layer and the lower metal layer.

Figure 5A:
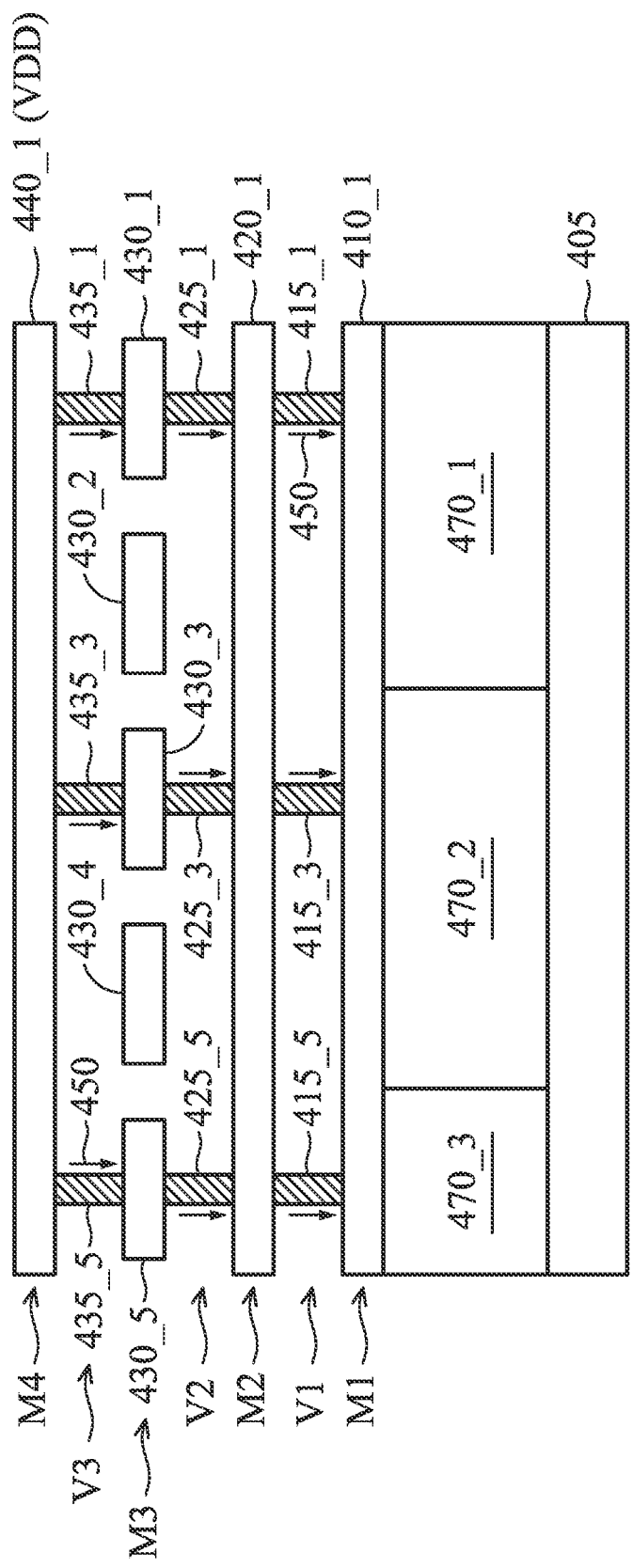
FIG. 5A illustrates a cross-sectional view of the circuit along line A-AA in FIG. 4, in accordance with some embodiments of the disclosure.

FIG. 5A illustrates a cross-sectional view of the circuit 400 along line A-AA in FIG. 4, in accordance with some embodiments of the disclosure. In FIG. 5A, the standard cells 470_1 through 470_3 are formed over a substrate 405. In some embodiments, the substrate 405 is a Si substrate. In some embodiments, the material of the substrate 405 is selected from a group consisting of bulk-Si, SiP, SiGe, SiC, SiPC, Ge, SOI—Si, SOI—SiGe, III-VI material, and combinations thereof.

In FIG. 5A, a metal line 410_1 is formed in a first metal layer M1 over the standard cells 470_1 through 470_3. The vias 415_1, 415_3 and 415_5 are formed in a first via layer V1 that is over the first metal layer M1. A metal line 420_1 is formed in a second metal layer M2 that is over the first via layer V1, and the metal line 420_1 is coupled to the metal line 410_1 through the vias 415_1, 415_3 and 415_5. The vias 425_1, 425_3 and 425_5 are formed in a second via layer V2 that is over the second metal layer M2. The metal lines 430_1 through 430_5 are formed in a third metal layer M3 that is over the second via layer V2, and the metal lines 430_1, 430_3 and 430_5 are coupled to the metal line 420_1 through the vias 425_1, 425_3 and 425_5, respectively. The vias 435_1, 435_3 and 435_5 are formed in a third via layer V3 that is over the third metal layer M3. The metal line 440_1 is formed in a fourth metal layer M4 that is over the third via layer V3, and the metal line 440_1 is coupled to the metal line 430_1, 430_3 and 430_5 through the vias 435_1, 435_3 and 435_5, respectively.

The metal lines 440_1, 430_1, 430_3, 430_5, 420_1 and 410_1 in FIG. 5A are configured as power nets for transferring a power signal VDD to the standard cells 470_1 through 470_3. Therefore, the current flowing through each of the vias 415_1, 415_3, 415_5, 425_1, 425_3, 425_5, 435_1, 435_3 and 435_5 is from the fourth metal layer M4 to the first metal layer M1, i.e., the current direction of each via is downward, as shown in label 450.

Figure 5B:
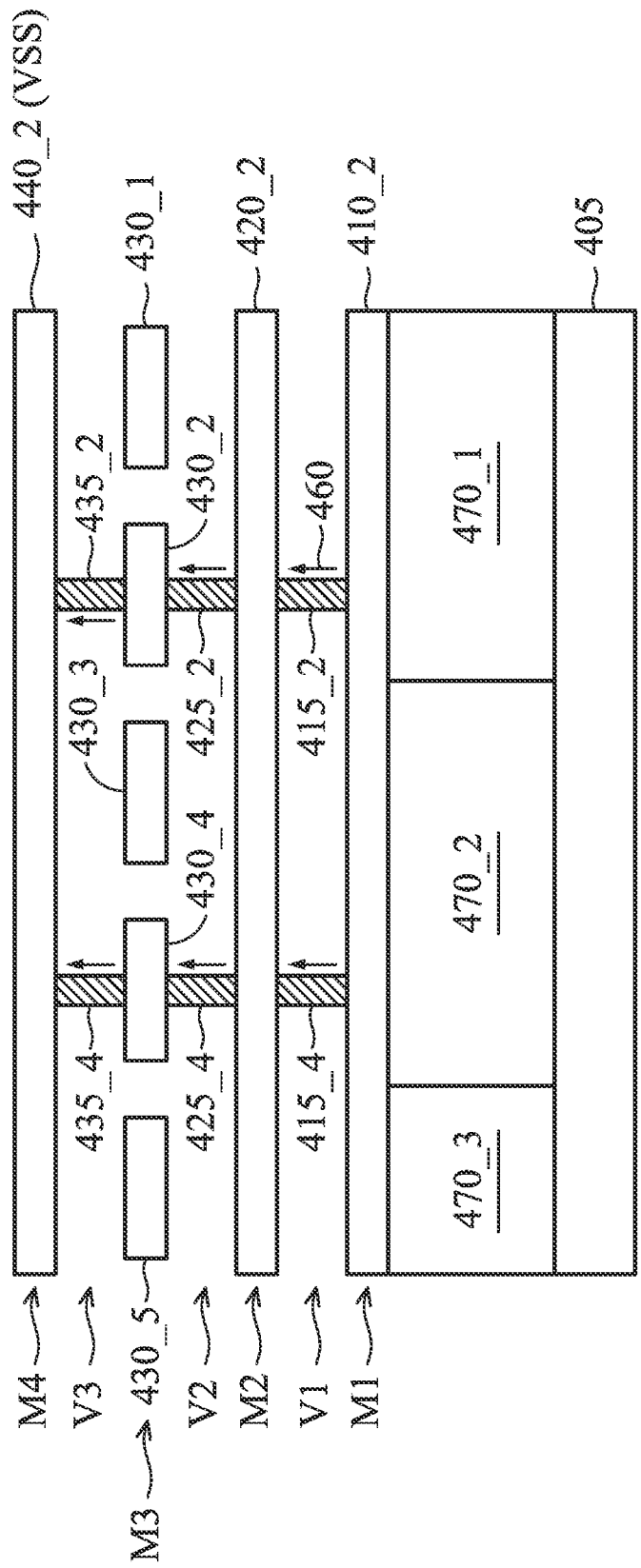
FIG. 5B illustrates a cross-sectional view of the circuit along line B-BB in FIG. 4, in accordance with some embodiments of the disclosure.

FIG. 5B illustrates a cross-sectional view of the circuit 400 along line B-BB in FIG. 4, in accordance with some embodiments of the disclosure. In FIG. 5B, the standard cells 470_1 through 470_3 are formed over the substrate 405. A metal line 410_2 is formed in the first metal layer M1 over the standard cells 470_1 through 470_3. The vias 415_2 and 415_4 are formed in the first via layer V1. A metal line 420_2 is formed in the second metal layer M2, and the metal line 420_2 is coupled to the metal line 410_2 through the vias 415_2 and 415_4. The vias 425_2 and 425_4 are formed in the second via layer V2. The metal lines 430_2 and 430_4 are formed in the third metal layer M3, and the metal lines 430_2 and 430_4 are coupled to the metal line 420_2 through the vias 425_2 and 425_4, respectively. The vias 435_2 and 435_4 are formed in the third via layer V3. The metal line 440_2 is formed in the fourth metal layer M4, and the metal line 440_2 is coupled to the metal line 430_2 and 430_4 through the vias 435_2 and 435_4, respectively.

The metal lines 440_2, 430_2, 430_4, 420_2 and 410_2 in FIG. 5B are configured as ground nets for transferring a ground signal VSS to the standard cells 470_1 through 470_3. Therefore, the current flowing through each of the vias 415_2, 415_4, 425_2, 425_4, 435_2 and 435_4 is from the first metal layer M1 to the fourth metal layer M4, i.e., the current direction of each via is upward, as shown in label 460.

Figure 6:
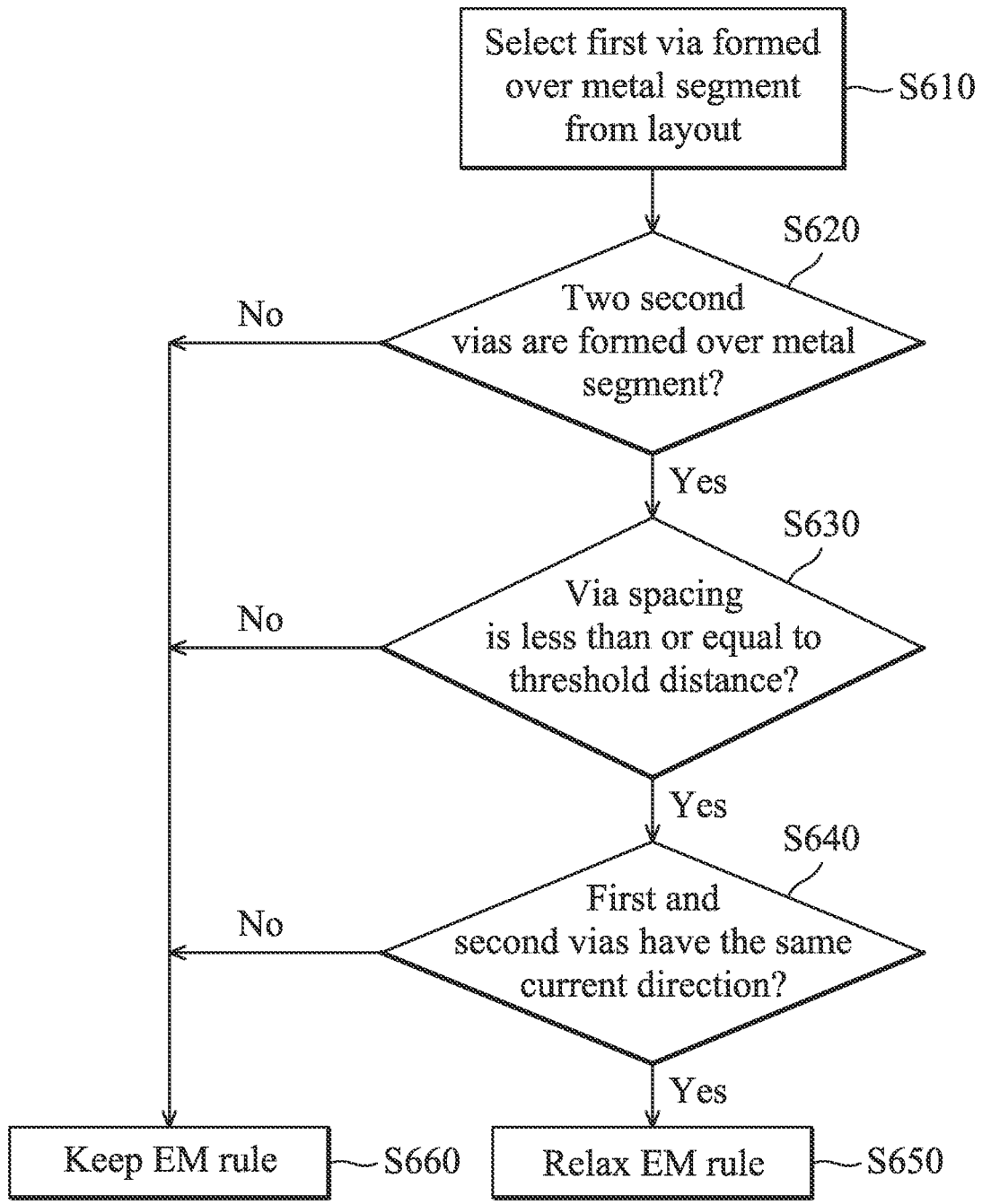
FIG. 6 illustrates a flowchart of the EM rule relax procedure, in accordance with some embodiments of the disclosure.
Figure 7:
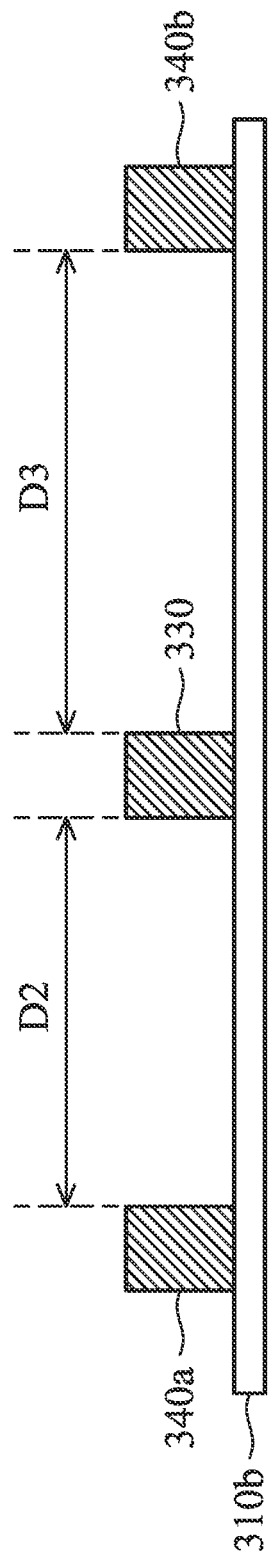
FIG. 7 shows a first via to be checked by the EM rule relax procedure of FIG. 6 for EM rule relax, in accordance with some embodiments of the disclosure.

FIG. 6 illustrates a flowchart of the EM rule relax procedure, in accordance with some embodiments of the disclosure. The flowchart of FIG. 6 may include other operations not illustrated here, and the various illustrated operations of method may be performed in a different order than shown. The flowchart of FIG. 6 may be performed in operation S112 or S114 of the method in FIG. 1. FIG. 7 shows a first via 330 to be checked by the EM rule relax procedure of FIG. 6 for EM rule relax, in accordance with some embodiments of the disclosure.

In operation S610, the first via 330 of FIG. 7 is selected from the layout according to the current simulation result of the IC (e.g., the simulated circuit properties). The first via 330 is formed over and in contact with a metal segment 310*b* of FIG. 7. As described above, the simulated circuit properties is obtained in operation S108 of the method in FIG. 1. Furthermore, the simulated circuit properties can be compared with various EM rules to obtain the EM severity ratios. In some embodiments, a via having an EM severity ratio that is greater than a specific value (e.g., 80%) is selected from the layout. In some embodiments, a via array is selected from the layout according to the current simulation result of the IC in operation S610.

In operation S620, it is determined whether two second vias are formed over the metal segment 310b. If no two second vias are formed over the metal segment 310b, the EM rule is kept for the first via 330 without relaxing (operation S660). Conversely, if two second vias 340a and 340b are formed over the metal segment 310b and in contact with the metal segment 310b, it is determined whether the distances from the first via 330 to each of the second vias 340a and 340b are less than or equal to a threshold distance (operation S630). In the example of FIG. 7, the two second vias 340a and 340b are formed over and in contact with the metal segment 310b. The distance between the first via 330 and the second via 340a is the via spacing D2, and the distance between the first via 330 and the second via 340b is the via spacing D3. Furthermore, the second vias 340a and 340b are positioned at two sides of the metal segment 310a. In other words, the first via 330 is positioned between the second vias 340a and 340b. In some embodiments, the distance between the first via 330 and each second via 340a/340b is less than or equal to 3 um (micrometer). In some embodiments, the distance between the first via 330 and each second via 340a/340b is within a specific range, such as 1 um to 3 um. It should be noted that the threshold distance or the specific range is determined based on the parameters of the processes that are used to fabricate the IC.

In operation S630, if the distance between the first via 330 and the second via 340a or 340b is greater than the threshold distance, the EM rule is kept for the first via 330 without relaxing (operation S660). Conversely, if the distances between the first via 330 and each of the second vias 340a and 340b are less than or equal to the threshold distance, it is determined whether the first via 330 and the second vias 340a and 340b have the same current direction (e.g., downward or upward) according to the current simulation result of the IC (operation S640). In some embodiments, the order of operations S630 and S640 can be interchanged.

As described above, the current direction of each via represents the direction in which the current flows through the via. In some embodiments, the current direction of the first via 330 and the second vias 340a and 340b is downward when the metal segment 310b is a power net for transferring a power signal VDD. In some embodiments, the current direction of the first via 330 and the second vias 340a and 340b is upward when the metal segment 310b is a ground net for transferring a ground signal VSS. In some embodiments, the current direction of the first via 330 or the second vias 340a or 340b is upward or downward when the metal segment 310b is a signal net for transferring a signal.

In operation S640, if the first via 330 and the second vias 340a and 340b have different current directions, the EM rule is kept for the first via 330 without relaxing (operation S660). Conversely, if the first via 330 and the second vias 340a and 340b have the same current direction, the EM rule is relaxed. In some embodiments, the EM rule is relaxed by decreasing the EM severity ratio of the first via 330.

Figure 8:
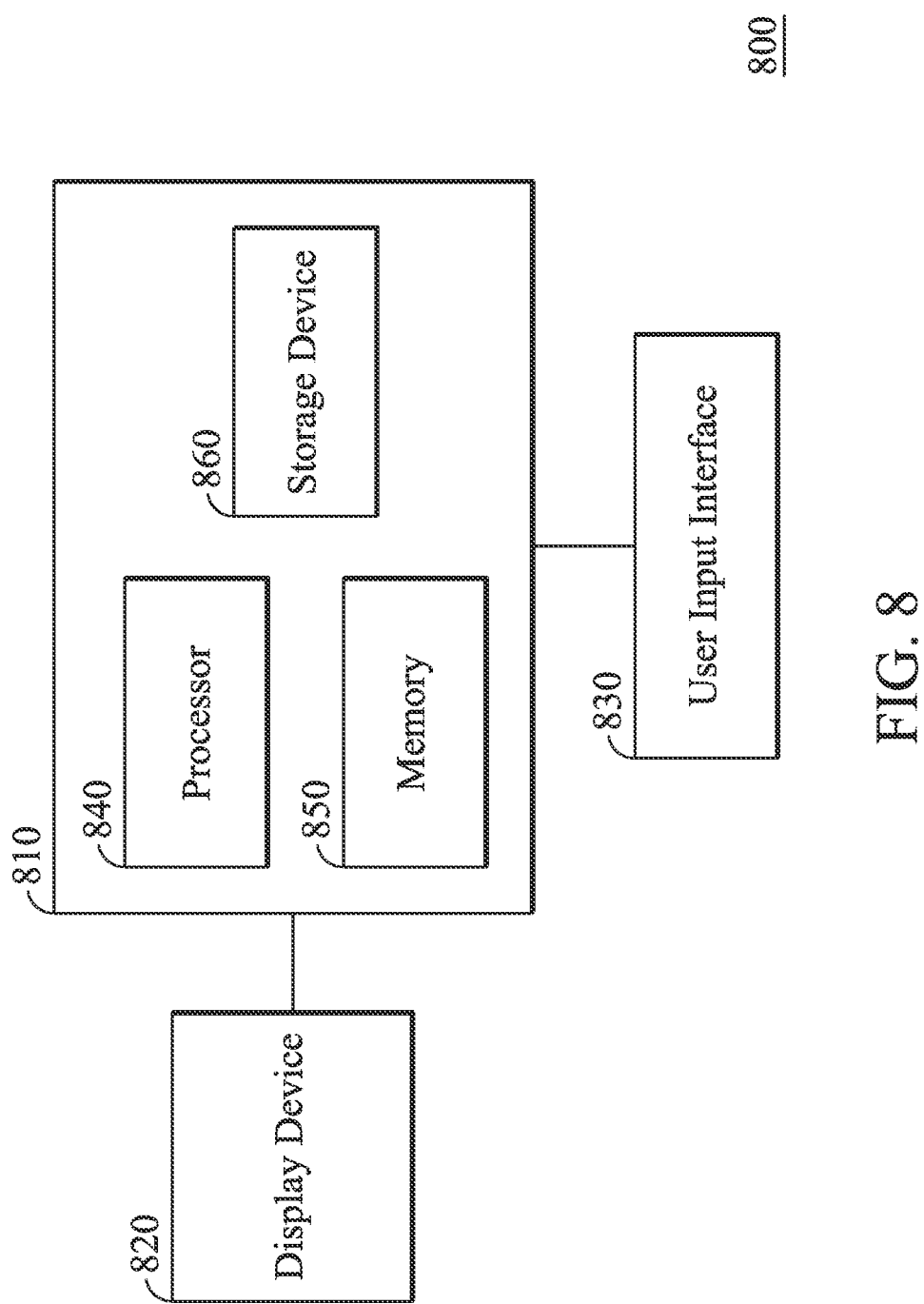
FIG. 8 shows a computer system, in accordance with some embodiments of the disclosure.

FIG. 8 shows a computer system 800, in accordance with some embodiments of the disclosure. The computer system 800 includes a computer 810, a display device 820 and a user input interface 830, wherein the computer 810 includes a processor 840, a memory 850, and a storage device 860. The computer 810 is coupled to the display device 820 and the user input interface 830, wherein the computer 810 is capable of operating an electronic design automation (EDA) tool. Furthermore, the computer 810 is capable of receiving the information regarding the layout of the IC and displaying the features of the layout on the display device 820. In some embodiments, the display device 820 is a GUI for the computer 810. Furthermore, the display device 820 and the user input interface 830 can be implemented in the computer 810. The user input interface 830 may be a keyboard, a mouse and so on. In the computer 810, the storage device 860 can store the operating systems (OSs), applications, and data that include input required by the applications and/or output generated by applications. The processor 840 of the computer 810 can perform one or more operations (either automatically or with user input), such as the EM simulation, the layout simulation or the current drawn simulation, in any method that is implicitly or explicitly described in this disclosure. Furthermore, during operation, the processor 840 can load the applications of the storage device 860 into the memory 850, and then the applications can be used by a user to create, view, and/or edit the related placement for IC design.

In some embodiments, the apparatus or manufacture including a computer useable or readable medium having control logic (software) stored thereon is also referred to herein as a computer program product or program storage device. This includes, but is not limited to, the computer system 800 and the memory 850, as well as tangible articles of manufacture embodying any combination of the foregoing. Such control logic, when executed by one or more data processing devices (such as computer system 800), causes such data processing devices to operate as described herein.

In some embodiments, the operations of FIGS. 1, 2 and 6, are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The layout and the simulation result described in this disclosure can be partially or fully stored on a computer-readable storage medium and/or a hardware module and/or hardware apparatus. A computer-readable storage medium may be, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Examples of hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and operations described in this disclosure can be partially or fully embodied as code and/or data stored in a computer-readable storage medium or device, so that when a computer system reads and executes the code and/or data, the computer system performs the associated methods and processes. The methods and operations can also be partially or fully embodied in hardware modules or apparatuses, so that when the hardware modules or apparatuses are activated, they perform the associated methods and processes. Note that the methods and operations can be embodied using a combination of code, data, and hardware modules or apparatuses.

Embodiments of methods for analyzing electromigration (EM) in an integrated circuit (IC) are provided. By performing an EM rule relax procedure according to the current simulation result of the IC (e.g., the simulated circuit properties obtained from the layout of the IC), the redundancy EM relax criteria can be checked, so as to relax the EM rule on the layout of the IC, thereby preventing over-design caused by the strict EM rules and decreasing the design area and cost of the IC. Furthermore, the EM rule relax procedure can be implemented in an EDA tool and can be used for EM sign-off in design flow.

In some embodiments, a method for analyzing electromigration (EM) in an integrated circuit (IC) is provided. The layout of the IC is obtained. A metal segment is selected from the layout according to a current simulation result of the IC. EM rule is kept on the metal segment when a single via is formed over and in contact with the metal segment in the layout. The EM rule is relaxed on the metal segment when two first vias are formed over and in contact with the metal segment in the layout. The two first vias have the same current direction.

In some embodiments, a method for analyzing electromigration (EM) in an integrated circuit (IC) is provided. The layout of the IC is obtained. A first via is selected from the layout according to a current simulation result of the IC. The first via is formed over and in contact with a metal segment in the layout. EM rule is kept on the first via when a single second via is formed over and in contact with the metal segment. The EM rule is relaxed on the first via when two second vias are formed over and in contact with the metal segment. The first via and the two second vias have the same current direction.

In some embodiments, a non-transitory computer-readable storage medium storing instructions that, when executed by a computer, cause the computer to perform a method for analyzing electromigration (EM) in an integrated circuit (IC), is provided. The layout of the IC is obtained. A metal segment is selected from the layout according to a current simulation result of the IC. EM rule is kept on the metal segment when a single via is formed over and in contact with the metal segment in the layout. The EM rule is relaxed on the metal segment when two first vias are formed over and in contact with the metal segment in the layout. The two first vias have the same current direction.

The foregoing outlines nodes of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for analyzing electromigration (EM) in an integrated circuit (IC), comprising:
   obtaining a layout of the IC;
   selecting a metal segment from the layout according to a current simulation result of the IC;
   keeping EM rule on the metal segment when a single via is formed over and in contact with the metal segment in the layout; and
   relaxing the EM rule on the metal segment when two first vias are formed over and in contact with the metal segment in the layout,
   wherein the two first vias have the same current direction.

2. The method as claimed in claim 1, wherein a distance between the two first vias is less than or equal to a threshold distance.

3. The method as claimed in claim 1, further comprising:
   obtaining current direction of each of the two first vias according to the current simulation result of the IC.

4. The method as claimed in claim 1, wherein relaxing the EM rule on the metal segment when the two first vias are formed over and in contact with the metal segment in the layout further comprises:
   decreasing EM severity ration of the metal segment.

5. The method as claimed in claim 1, wherein the metal segment is a power net, and the two first vias have the downward current direction.

6. The method as claimed in claim 1, wherein the metal segment is a ground net, and the two first vias have the upward current direction.

7. The method as claimed in claim 1, wherein the metal segment is a signal net, and the two first vias have the downward or upward current direction.

8. The method as claimed in claim 1, further comprising:
   keeping the EM rule on the metal segment when two second vias are formed over and in contact with the metal segment in the layout,
   wherein the two second vias have different current directions.

9. A method for analyzing electromigration (EM) in an integrated circuit (IC), comprising:
   obtaining a layout of the IC;
   selecting a first via from the layout according to a current simulation result of the IC, wherein the first via is formed over and in contact with a metal segment in the layout;
   keeping EM rule on the first via when a single second via is formed over and in contact with the metal segment; and
   relaxing the EM rule on the first via when two second vias are formed over and in contact with the metal segment,
   wherein the first via and the two second vias have the same current direction.

10. The method as claimed in claim 9, wherein the two second vias are formed on both sides of the first via in the layout, and a distance between the first via and each of the two second vias is less than or equal to a threshold distance.

11. The method as claimed in claim 9, further comprising:
    obtaining current direction of each of the first via and the two second vias according to the current simulation result of the IC.

12. The method as claimed in claim 9, wherein relaxing the EM rule on the first via when the two second via are formed over and in contact with the metal segment, further comprises:
    decreasing EM severity ration of the first via.

13. The method as claimed in claim 9, wherein the metal segment is a power net, and the first via and the two second vias have the downward current direction.

14. The method as claimed in claim 9, wherein the metal segment is a ground net, and the first via and the two second vias have the upward current direction.

15. The method as claimed in claim 9, wherein the metal segment is a signal net, and the first via and the two second vias have the downward or upward current direction.

16. The method as claimed in claim 9, further comprising:
keeping the EM rule on the first via when more than two second vias are formed over the metal segment.

17. A non-transitory computer-readable storage medium storing instructions that, when executed by a computer, cause the computer to perform a method for analyzing electromigration (EM) in an integrated circuit (IC), the method comprising:
obtaining a layout of the IC;
selecting a metal segment from the layout according to a current simulation result of the IC;
keeping EM rule on the metal segment when a single via is formed over and in contact with the metal segment in the layout; and
relaxing the EM rule on the metal segment when two first vias are formed over and in contact with the metal segment in the layout,
wherein the two first vias have the same current direction.

18. The non-transitory computer-readable storage medium as claimed in claim 17, wherein a distance between the two first vias is less than or equal to a threshold distance.

19. The non-transitory computer-readable storage medium as claimed in claim 18, wherein relaxing the EM rule on the metal segment when the two first vias are formed over and in contact with the metal segment in the layout further comprises:
decreasing EM severity ration of the metal segment.

20. The non-transitory computer-readable storage medium as claimed in claim 17, further comprising:
keeping the EM rule on the metal segment when two second vias are formed over and in contact with the metal segment in the layout,
wherein the two second vias have different current directions.

* * * * *